United States Patent [19]
Magne et al.

[11] Patent Number: 5,724,371
[45] Date of Patent: Mar. 3, 1998

[54] PHOTOINSCRIBED BRAGG GRATING SENSOR WITH A GOOD SIGNAL-TO-NOISE RATIO

[75] Inventors: Sylvain Magne, Chatillon; Pierre Ferdinand, Houilles; Jean-Claude Gaucher, Le Val St Germain, all of France

[73] Assignee: Commissariat a L'Energie Atomique, France

[21] Appl. No.: 595,490

[22] Filed: Feb. 1, 1996

[30] Foreign Application Priority Data

Feb. 21, 1995 [FR] France .................. 95 01973

[51] Int. Cl.⁶ .................................................... H01S 3/30
[52] U.S. Cl. .............................................. 372/6; 372/102
[58] Field of Search ............... 372/6, 102; 385/12; 356/345, 350

[56] References Cited

U.S. PATENT DOCUMENTS

| | | | |
|---|---|---|---|
| 4,530,097 | 7/1985 | Stokes et al. | 372/6 |
| 4,649,529 | 3/1987 | Avicola | 385/12 |
| 5,189,676 | 2/1993 | Wysocki et al. | 372/6 |
| 5,208,819 | 5/1993 | Huber | 372/38 |
| 5,255,274 | 10/1993 | Wysocki et al. | 372/20 |
| 5,361,130 | 11/1994 | Kersey et al. | 356/345 |
| 5,488,475 | 1/1996 | Friebele et al. | 372/6 |
| 5,500,908 | 3/1996 | Liedenbaum et al. | 356/73.1 |

OTHER PUBLICATIONS

Kersey et al; "Multi-Element Bragg-Grating Based Fibre-Laser Strain Sensor"; May 27, 1993;pp. 964-966; Electronics Letters vol. 29, No. 11.

Kersey et al; "Multiplexed Bragg Grating Fibre-Laser Strain-Sensor System with Mode-Locked Interrogation"; Jan. 7, 1993; pp. 112-114; Electronics Letters; vol. 29, No. 1.

*Primary Examiner*—Rodney B. Bovernick
*Assistant Examiner*—Robert E. Wise
*Attorney, Agent, or Firm*—Hayes, Soloway, Hennessey, Grossman & Hage, P.C.

[57] ABSTRACT

The present invention relates to a high capacity, high signal-to-noise ratio sensor incorporating an array of Bragg grating transducers photoinscribed on a dielectric guide and a feedback loop incorporating a wavelength selective element which is time modulated making it possible to obtain a laser sensor selectively switched by each Bragg grating.

Application to monitoring strains or temperatures in a structure.

13 Claims, 3 Drawing Sheets

PHOTOINSCRIBED BRAGG GRATING SENSOR WITH A GOOD SIGNAL-TO-NOISE RATIO

DESCRIPTION

1. Technical Field

The present invention relates to a generating device having a high signal-to-noise ratio (SNR) for the signal supplied by a Bragg grating transducer photoinscribed in a dielectric guide and for multiplexing transducers arranged in series in a sensor array.

2. Prior Art

At present, optical fiber sensor arrays are passive in the sense that said sensors do not generate by their own radiation permitting the transmission of the measured information. Such optical fiber sensor arrays appeared in the second half of the 1980's and are optical fiber strain sensor arrays usually with photoinscribed Bragg gratings as strain transducer components.

One of the first sensor array architectures published uses an optical source with a wider spectral width than the spectral band containing the spectra of the Bragg gratings and sequentially analyzes the wavelengths reflected by said transducers (references [1] and [2]). These transducers are passive, because they merely reflect a small proportion of the incident light.

The design of laser sensors makes it possible to considerably increase the SNR of the detection. It is considered that active laser sensors operating continuously supply SNR values higher by 40 to 50 dB than their passive equivalents (reference [3]).

Figure 1:
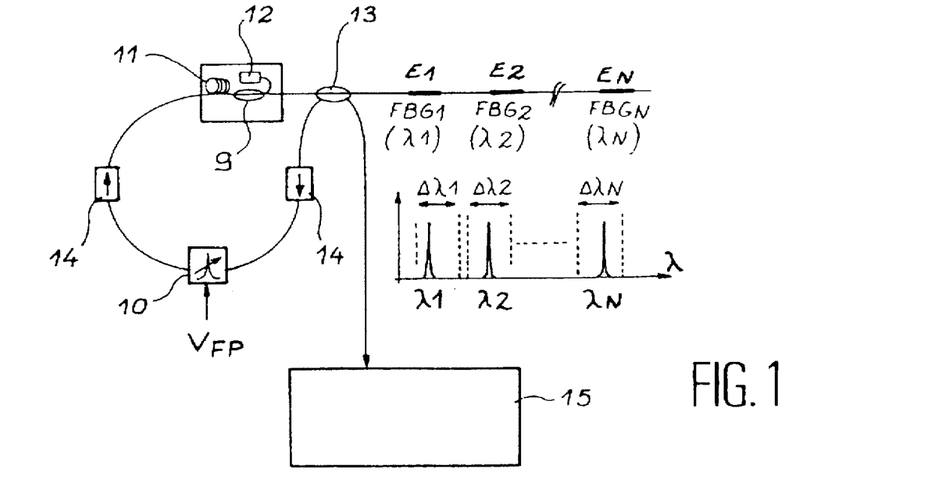
FIG. 1 illustrates a prior art device.

Among all the prior art devices listed in references [1], [2], [3] and [9] at the end of the description, the document closest to the invention is [3]. The architecture proposed by A. D. Kersey and W. W. Morey is a fiber laser sensor consisting of a measuring arm on which are photoinscribed the transducer Bragg gratings and a feedback loop ensuring the return of the laser wave, as shown in FIG. 1. FIG. 1 shows a tunable Fabry-Perot interferometer 10, an erbium doped fiber 11, a pumping laser diode 12, a coupler 13, a coupler multiplexer 9, insulators 14, an optical spectrum analyzer 15, and sensor elements in the form of Bragg gratings FBG1, FBG2, . . . FBG$_n$ (FGB: Fibre Bragg Grating).

By modifying the voltage applied to the piezoelectric ceramic of the tunable Fabry-Perot interferometer (cf. reference [4]), the transfer function thereof is spectrally translated. The laser effect occurs when the transparency spectral band of said interferometer covers the characteristic wavelength of one of the Bragg gratings. The optical signal emitted by the thus formed laser is continuous, because the interferometer is not time modulated. This signal is analyzed on the unconnected channel of the coupler 13 by the spectrum analyzer 15, which is not shown in document [3].

Four problems have to be solved in the specification sheet of such a sensor array:

increase of the measuring speed, increase of sensitivity (high SNR), increase of the capacity (large number of transducers on the same measuring line), optimization of the cost of the device (economy of means).

It is also possible to reveal three limitations inherent in the described device.

The first limitation relates to the reading of the wavelength of the Bragg grating representative of the information to be measured (temperature, strains, etc.). At present, the solution proposed by A. D. Kersey and W. W. Morey (reference [3]) requires two selective systems, one used for demultiplexing the sensor (i.e. "chooses" the sensor to be observed) and the other to read its characteristic wavelength. This solution is costly, because it increases the number of precision optical elements, namely a Fabry-Perot interferometer, another selective device which can be a second Fabry-Perot interferometer, as well as two insulators. In an industrial, cost optimization context (fourth problem), it is desirable to reduce the number of precision optical elements and simplify the detection electronics.

The second limitation is the limitation in the measuring speed induced by the analysis method (first problem). Thus, the acquisition time is limited by the time for establishing the continuous operating conditions of the laser, but particularly by the analysis of the complete optical spectrum of each Bragg grating. In document [3], said analysis is performed by a commercial optical spectrum analyzer.

The third limitation relates to a high energy loss occurring in the feedback loop, which functions on return and not in reflection. On return, the wave traverses the loop in a single direction as a result of the insertion of the insulators and only 25% of the energy is reflected. Moreover, insulators also lead to a significant energy loss (approximately 75% absorption). This optical concept leads to high optical energy losses requiring a more powerful pumping and involving a reduction in the capacity of the sensor array due to the reduction in the width of the spectral band of the gain ensuring the laser effect (third problem).

Compared with the prior art solution, the invention aims at simplifying the concept of the optics, the electronic detection and the processing of the signal, by using less components, but still being more reliable and less onerous.

DESCRIPTION OF THE INVENTION

The present invention relates to a high signal-to-noise ratio sensor, characterized in that it comprises at least one Bragg grating transducer photoinscribed on a dielectric guide and a feedback loop constituted by a Sagnac interferometer, which includes a time modulated, selective wavelength element permitting the implementation of a switched laser sensor.

Advantageously a high capacity sensor or device according to the invention has more than one Bragg grating transducer at different characteristic wavelengths contained in a spectral gain band of the amplifier material, and the demultiplexing of these transducers, as well as the measurement of the characteristic wavelengths thereof are both obtained by selective laser switching producing a succession of laser pulses in a sequential manner.

The principle of this device consists of the continuous time modulation of the transfer function of a wavelength selective filter in order to carry out the demultiplexing and measurement of the wavelength of the transducer Bragg gratings by the selective switching of the laser effect.

Advantageously the wavelength selective element is a tunable Fabry-Perot interferometer, whose free spectral range is larger than the useful width of the gain curve corresponding to the spectral gain band of the amplifier material and adequate for switching the laser effect. The device according to the invention is integrated in "compatible fiber" form. Advantageously the Sagnac interferometer is of the equilibrated or balanced type, so that it behaves like a 100% reflective fiber reflector.

In an advantageous embodiment, the device according to the invention comprises a coupler-multiplexer, connected at the input to a pumping laser diode and to an output of a 50% adjustable coupler, whose two inputs are connected to a tunable Fabry-Perot interferometer, Bragg gratings being photoinscribed on a transducer fiber (advantageously of germanosilicate) welded to an amplifier fiber (advantageously of germanosilicate) doped by ions of rare earths, the transducer fiber being terminated by a nonreflective cleaving (e.g. bevelled). A modulator is connected on the one hand to the interferometer and to an acquisition-sampling device supplying a parallel output signal corresponding to the tuning wavelength values. A photodiode receiving the switched laser signal is also connected to said acquisition-sampling device.

The coupler-multiplexer is of the fiber type to ensure the coupling of the pumping beam from the laser diode, whilst ensuring the transmission of the laser beam to the feedback loop.

Advantageously the device according to the invention also comprises an electronic system for the sequential acquisition of the Bragg tuning wavelengths. This electronic acquisition system comprises an amplifier, connected to the photodiode, followed by a threshold comparator, a sample and hold circuit receiving the output of the comparator on its switching input and the signal leaving the modulator on its signal input. A 14 bit analog-digital converter connected to a computer is located at the output of the sample and hold circuit, a resetting of the latter taking place at the end of conversion.

According to an advantageous embodiment of the invention, use is made of a linear cavity with a balanced Sagnac interferometer-type feedback loop behaving on tuning like a 100% reflective reflector. Time modulation takes place of the Fabry-Perot interferometer tuning control signal, at one of the ends of the linear cavity sampling takes place of the laser emission signal and at said instant sampling takes place of the value of the Fabry-Perot interferometer control signal. Thus, an accumulation takes place of the improvements of the SNR respectively due to the principle of the laser sensor and to the operation of the laser under switched conditions, whilst reducing the response time and simplifying the circuits. The device also permits the multiplexing of the different transducers in series on the optical fiber.

Advantageously, the device according to the invention is also able to function with a light conduit produced in integrated optics forms with an open air light propagation.

The main advantages of the device according to the invention are described hereinafter.

The use of a single time modulated, selective element simultaneously fulfilling the demultiplexing function and synchronizing the information taking of the modulation signal representative of the measurand. The acquisition electronics are switched by the laser pulses. However, in document [3] and as shown in FIG. 1, two selective systems are necessary. The authors of said document analyze a complete optical spectrum (all the values of the signal at all the spectrum wavelengths). In the invention, the measurement of the signal supplied to the selective modulation system is punctiform (i.e. the measurement of a single value).

The fiber laser formed from the feedback loop and Bragg gratings functions in the switched mode, which makes it possible to obtain very powerful pulses (above 1 Watt) ensuring an increase in the SNR. However, in document [3], the laser operates continuously, so that the SNR is lower.

The pulse-type operating mode leads typically to a response time per sensor of a few milliseconds. However, in [3], the response time of the device is limited by the acquisition of a continuous optical spectrum. The device according to the invention is also much faster (a few milliseconds per sensor instead of a few seconds).

Finally, in document [3] use is made of two insulators to ensure the circulation of the wave in a single direction and for refining the laser spectrum. However, the design of the device according to the invention is simpler using the reflective property of the loop serving as a selective mirror. The two insulators of [3] are replaced by an adjustable coupler regulated in such a way that there is no reflection, except at resonance in transmission permitted by the tunable selection system (e.g. Fabry-Perot interferometer) for which the loop then behaves like a fiber reflector. The reflected energy proportion is then a function of the losses induced by the selective system. Typically such a loop then reflects 50% of the signal, whereas the feedback loop of document [3] reflects less than 10% of the signal (25% transmission of the insulators and 25% return of the loop). In the device according to the invention, the pumping power is consequently lower and the capacity of the sensor higher (number of transducers per measuring line).

Advantageously the device according to the invention can be used for monitoring strains or temperatures in a structure.

DETAILED DESCRIPTION OF EMBODIMENTS

Figure 2:
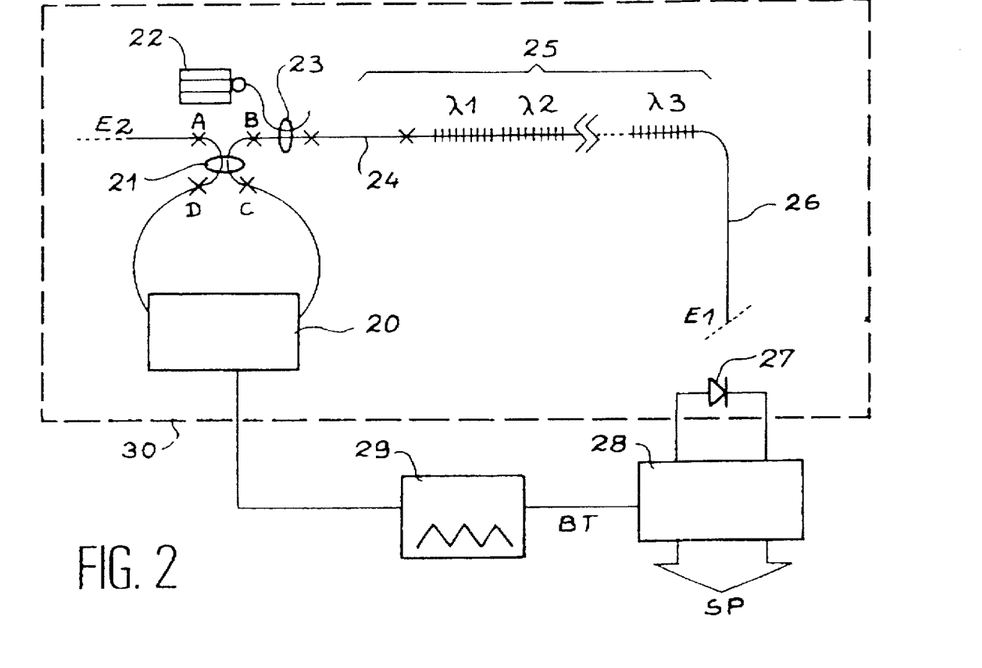
FIG. 2 illustrates the device of the invention.

As shown in FIG. 2, the device according to the invention is a switched fiber laser sensor array. In FIG. 2, the fiber coupler-multiplexer 23 is connected at the input to a pumping laser diode (fiber type) 22 and to an output of a 50% adjustable coupler 21, whose two inputs are connected to a tunable Fabry-Perot interferometer. Bragg gratings 25 are photoinscribed on a fiber 26 welded to a doped fiber 24 (e.g. with rare earth ions) connected to the coupler-multiplexer 23, the fiber 26 having at its other end a non-reflective cleaving (e.g. bevelled). A modulator 29 is connected on the one hand to the interferometer 20 and to an acquisition-sampling device 28, the signal BT being a time base and the signal SP a parallel digital output (tuning wavelength values). A photodiode 27 is also connected to said acquisition-sampling device 28.

The optical signal constituted by laser pulses can be observed either at end E1 (Bragg grating transmission) or at end E2 (very small residual transmission of a few % of the feedback loop due to a slight energy asymmetry at the bridges D and C).

The device according to the invention consists of producing a linear cavity making use of a reflector e.g. of the balanced Sagnac interferometer type (equally distributed coupling (50%) of the energy in both branches), so that it behaves like a 100% reflective fiber reflector.

This behaviour has been used on a number of occasions for producing fiber lasers and functions in the following way. The two waves from D and C and resulting from B traverse the same optical path (to within the phase displacement π/2 of the coupler) and recombine after passing into the loop in order to destructively interfere at the port A and constructively at the port B of the coupler (reference [6]). This behaviour inversion (reflection to transmission) has already been demonstrated with a Bragg grating photoinscribed in a feedback loop (reference [7]).

The fact that all the energy is reflected at port B results from the phase displacement imposed by the coupler. Therefore the loop serves as a fiber "mirror".

In view of the high gain of fiber lasers, small reflections of about a % are able to switch an uncontrolled laser emission. Therefore any parasitic reflection must be minimized. For this purpose, the coupler 21 must be precisely adjusted to better than a few %. If this condition is too severe for the manufacture of couplers in series, the coupler 21 can advantageously be chosen in adjustable form (reference [8]) in order to allow a precise setting of the coupling coefficient in the useful gain wavelength band.

The other interest of an adjustable coupler 21 is to be able to obviate, by a simple setting, the asymmetry of the insertion losses in the cavity of the Fabry-Perot interferometer 20 (the insertion losses are largely dictated by the coupling in the fibers and which is usually different for each of them).

When the coupler 21 is correctly adjusted in order to ensure the recombination of two beams of the same energy, the operation of the loop is reversed with respect to all the wavelengths not transmitted by the Fabry-Perot interferometer. This means that the energy then no longer interferes constructively in B, but instead in A, so that no laser resonance is then possible whilst ensuring that the wave is not reflected at the end E2. It is therefore necessary to prevent any parasitic reflection at the end of the two fibers (end E2 of the feedback loop, i.e. point A and end of the carrier fiber of the Bragg gratings, i.e. end E1). Rather than deposit an antireflection dielectric coating, it is simpler to polish the end of each of these fibers in bevel form in order to eliminate any reflection.

In more general terms, the power of the pumping diode 22 is adjusted so as to obtain an adequate gain to generate sufficiently powerful pulses whilst avoiding an uncontrolled laser effect on the aforementioned parasitic reflections. For the same reason, the double passage (outward and return) spontaneous amplified emission in the amplifier fiber after reflections on the Bragg gratings contributes to the saturation of the gain and to the reduction of the efficiency of the laser. The power of the diode 22 must consequently be adjusted in accordance with one or other of these limitations.

Figure 3:
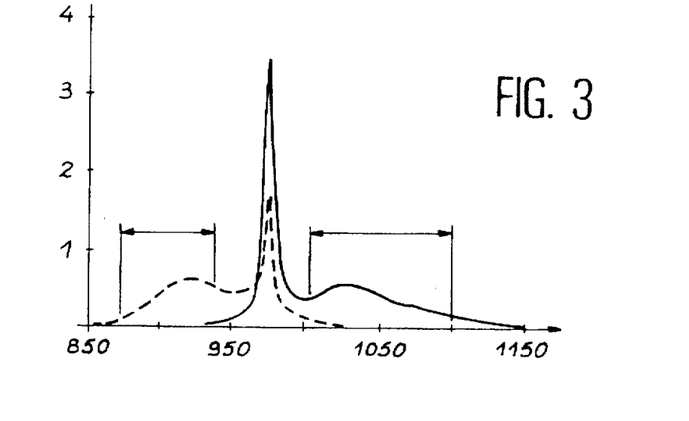
FIG. 3 shows the absorption and fluorescence curves typical of a rare earth ion (case of $Yb^{3+}$ ion).

In the device according to the invention, the Bragg gratings are chosen in such a way that their characteristic wavelengths are contained in the spectral gain band of the amplifier material. The spectral band leading to an adequate gain for switching the laser effect is called the "useful gain band" and is shown in FIG. 3 for a rare earth ion, e.g. the ytterbium ($YB^{3+}$ ion). FIG. 3 shows absorption curves (dotted lines) and fluorescence curves (continuous lines) typical for such an ion. The useful gain curve is located in the center of the fluorescence distribution and can contain up to 50 sensors of 2 nm wavelength band. The laser effect occurs at the time when the tunable filter scanning the wavelengths becomes reflective for the tuning wavelength of one of the gratings.

The laser sensors are thus sequentially observed. The major advantage of this demultiplexing concept is that the laser functions in the switched mode. Thus, the laser sensor emits a pulse as a result of a spectral overlap between the spectral transfer function of the time modulated tunable filter and that of the feedback-ensuring Bragg grating.

The laser emission serves as a synchronization signal and the placing in the memory of the electrical characteristics of the tunable filter at this precise time gives the sought information.

The selective wavelength element can e.g. be a tunable Fabry-Perot interferometer, whose integration in "compatible fiber" form is ensured by several designers (document [4]) and is described in numerous publications (document [5]).

Figures 4, 5, 6:
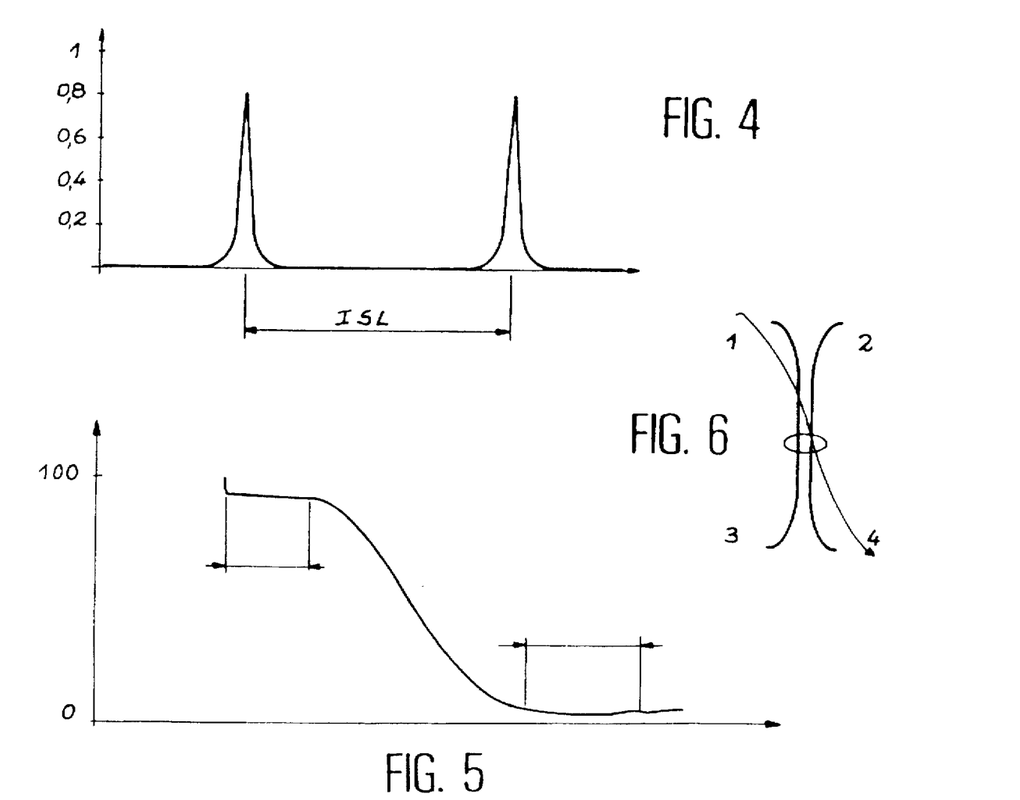
FIG. 4 illustrates a typical spectral transfer function of a Fabry-Perot interferometer.
FIG. 5 shows a spectrum in transmission of the coupler-multiplexer of FIG. 2.
FIG. 6 illustrates the definition of the transmission behaviour of the coupler-multiplexer of FIG. 5.

The Fabry-Perot interferometer can only be used in a loop configuration. It cannot simply be used in a linear configuration, because the latter filters spectrally in transmission and not in reflection, as shown in FIG. 4 illustrating the typical spectral transfer function of a Fabry-Perot interferometer.

The Fabry-Perot interferometer is chosen in such a way that its free spectral range (FSR) exceeds the useful width of the gain curve. Thus, a single transmission peak is present at all times within the gain curve, which proscribes any simultaneous laser effect at two separate wavelengths spaced by the free spectral range. Its insertion rate (optical loss induced by the component from the input fiber to the output fiber) is generally approximately 2 to 3 dB (50%).

The fineness of such fiber interferometers (document [4]) is approximately 100 to 1000, so that its spectral line width (which is equal to the free spectral range divided by the fineness) is approximately 0.1 to 0.5 nm. Certain non-fiber Fabry-Perot cavities make it possible to attain finenesses of approximately 40,000 (Newport supercavity) so that spectral widths of approximately 0.01 nm can be obtained.

Each sensor is identified by its Bragg wavelength contained in the gain band, as shown in FIG. 3, and has a spectral wavelength evolution range representative of the information to be measured (typically a few nm evolution about the central wavelength). Table I at the end of the description, which is an example of a correspondence table for pumping wavelengths and operational laser wavelengths for the main rare earth ions of interest, gives the main rare earth ions of interest and their spectral bands (absorption and gain) making it possible to implement such a laser diode-pumped active sensor array. The chosen spectral range of the laser diode is defined by the pumping band, whilst the gain band corresponds to the useful spectral multiplexing range. Advantageously, the ions $Yb^{3+}$ and $Nd^{3+}$ are used due to their very wide gain bands allowing a very large multiplexing capacity (very large number of Bragg transducers per measuring line and typically 30 to 50) and their high laser efficiencies. In another embodiment of the invention, use will be made of the $Er^{3+}$ ion, whose gain band is compatible with the optoelectronic components used in telecommunications.

The device according to the invention is also constituted by the fiber coupler-multiplexer 23 (WDM—Wavelength Division Multiplexer) designed so as to ensure the coupling of the pumping beam from the laser diode 22, whilst ensuring the transmission of the laser beam to the feedback loop. This coupling component is commercially available at three telecommunications wavelengths, namely 830, 1300 and 1550 nm. It can be produced on request at other wavelengths of interest. FIG. 5 illustrates a spectrum in transmission (by coupling) of said coupler-multiplexer, from port 1 to port 4, as illustrated in FIG. 6.

Figure 7:
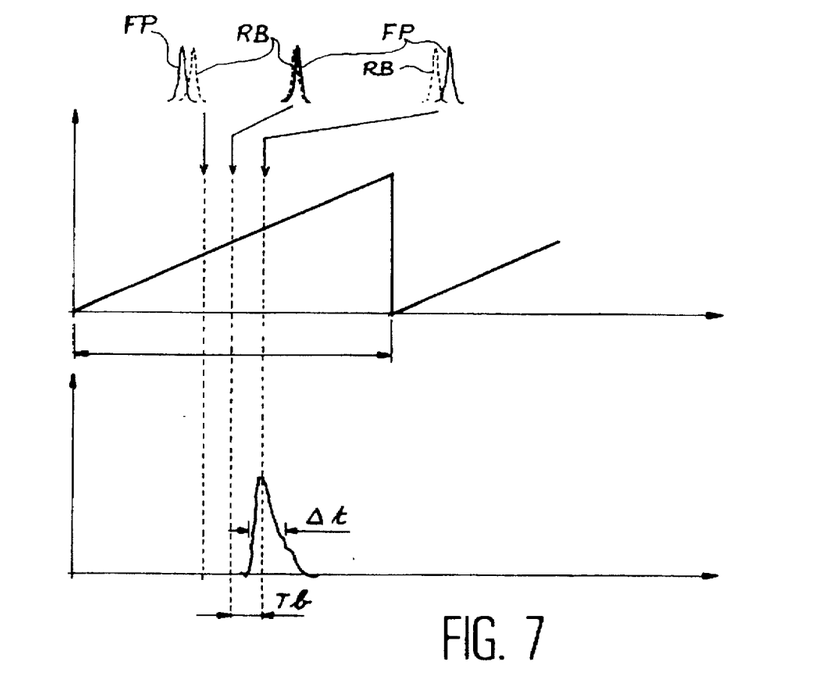
FIG. 7 illustrates the principle of selective interrogation of the Bragg gratings.

The principle of selective interrogation of gratings (time diagrams) is illustrated in FIG. 7, which shows the spectral transfer functions:

Fabry-Perot: FP.

Bragg grating: BG.

As soon as there is an increase in the modulation voltage applied to the piezoelectric ceramic shim of the Fabry-Perot interferometer, the reflection peak of the feedback loop is spectrally displaced by mechanical extension of the resonator.

At each spectral coincidence between the transfer functions BG of the interrogated grating and the spectral transfer function FP of the Fabry-Perot interferometer, the switched laser resonance can occur. The start of the construction of the laser pulse intervenes on the flank of the spectral transfer function of the interferometer.

If the coincidence of the two transfer functions takes place for a time exceeding the laser pulse construction time, the latter can appear. The switched laser wave then appears slightly delayed compared with the moment at which the transfer functions overlap. The reason is that the pulse must firstly be constructed within the laser cavity (formed from the feedback loop, the amplifier fiber and the measuring arm carrying the photoinscribed Bragg gratings). For this purpose it must perform one or two outward and return paths within the cavity, which induces a delay corresponding to the lightwave propagation within the resonator. Thus, the switching signal appears with a time lag compared with the spectral overlap. If the modulation frequency remains constant, the time lag is constant between individual gratings and is intrinsically taken into account by the calibration of the measuring chain. If the modulation frequency is not constant, the use of an unstrained reference Bragg grating then makes it possible to obtain independence of said time lag.

The laser pulse construction time is written:

$$T_b = \frac{25 \pm 5}{\frac{\Delta N_0}{\Delta N_s} - 1} \cdot \tau_R \quad (1)$$

with:

$$\frac{\Delta N_0}{\Delta N_s} = \frac{\text{"vacuum" population inversion}}{\text{threshold population inversion}}$$

The "vacuum" population inversion corresponds to the population inversion obtained long after the overlap time in the absence of a laser resonance (i.e. after closing the cavity by Fabry-Perot interferometer). The threshold population inversion corresponds to the population inversion which would be maintained if the laser emitted under continuous conditions under the feedback conditions fixed by the cavity when the interferometer transmits the selected wavelength.

It is possible to link the population inversion with the pumping power under continuous conditions by conventional equations as a function of the laser type (largely placed in two categories, with four or three levels, as a function of whether the laser relaxation takes place on the fundamental level (three levels) or on an intermediate level (four levels)).

For a four-level laser, the population inversion can be written:

$$\Delta N = \frac{\frac{I_p}{I_{sat}} - \exp(-x)}{\frac{I_p}{I_{sat}} + 1 + \exp(-x)}$$

in which $$x = \frac{h \cdot \nu_{12}}{k \cdot T}$$

$h \cdot \nu_{12}$ being the energy gap between the fundamental level and the laser relaxation level and $k.T$ is the thermal energy.

For a three-level laser, the population inversion can be written:

$$\Delta N = \frac{\frac{I_p}{I_{sat}} - 1}{\frac{I_p}{I_{sat}} + 1}$$

The term $25 \pm 5$ of equation (1) corresponds to a mean estimate of a term $$\ln\left(\frac{I_{laser}}{I_{bridge}}\right)$$

which physically represents the ratio between the circulating laser intensity (in the resonator) and the spontaneous intensity (the only one which exists before the pulse appears). The logarithmic term makes the ratio of a constant order of magnitude, so that the important point is to establish that the construction time $T_b$ is only dependent on the ratio of the population inversions and the life of the photon $\tau_R$ (also called the characteristic life of the laser resonator) and which is written:

$$\tau_R = \frac{\left(\frac{2 \cdot N \cdot L}{c}\right)}{\ln(R \cdot (1-A))} = \frac{2 \cdot N \cdot L}{A \cdot c} \quad (2)$$

in which A is the internal absorption of the resonator (mainly fixed by the Fabry-Perot interferometer insertion losses), R is the reflection coefficient of the cavity determined by the feedback loop (close to 100%) and the reflection of the Bragg gratings (exceeding 50% and typically close to 90 to 95%), N is the effective index of the fundamental mode LPOI and L is the laser cavity length (corresponding to the length of the measuring arm).

The duration of an outward and return path of the laser wave in the cavity corresponds to:

2.N.L./c, c being the speed of light in vacuum, the life of the photon being one or two times said life.

Table II gives the typical photon life periods of such a cavity for several fiber lengths. It is assumed that the feedback loop is a few dozen centimeters long and that it consequently has a negligible length compared with the distances from the gratings to the loop.

The time width of the pulse is written:

$$\Delta t = \tau_R \quad (3)$$

Three parameters impose a modulation speed limit of the device and therefore its final response time, i.e. the construction time of the switched laser wave, the overlap time of the amplifier material after each pulse and finally the analog-digital conversion time of the sampled data.

An order of magnitude will be given for each of these parameters in order to determine that which most limits the operation of the overall device.

Limitation by the Construction Time

Knowing that the spectral line width $\Delta\lambda$ of photoinscribed Bragg gratings is a few Å (a few 0.1 nm), the switched wave construction condition is:

$$\frac{T_b}{\Delta\lambda} < \frac{T}{\Delta\lambda_u} \quad (4)$$

in which $\Delta\lambda_u$ is the width of the useful gain band of the laser (cf. FIG. 3 and table I).

Thus, the modulation frequency solely limited by the construction time is subject to the following condition:

$$f = \frac{1}{T} < f_{max}^{(1)} = \frac{\Delta\lambda}{\Delta\lambda_u} \cdot \frac{1}{T_b} \quad (5)$$

The construction time is dependent on the distance separating the feedback Bragg grating from the feedback loop (i.e. the cavity length). Thus, for a cavity length of 100 meters, the construction time is approximately 1 microsecond and for a resonator fineness of approximately 1000, the critical frequency of construction $f_{max}^{(1)}$ is typically limited to frequencies of a few kHz to 10 kHz.

Table II at the end of the description gives the correspondence between the distance of the Bragg grating to the feedback loop and the corresponding photon life. The critical modulation frequency induced by the construction time (critical construction frequency) is also mentioned.

Limitation by Overlap Time

As indicated hereinbefore, another parameter fixes a modulation frequency limited, namely the overlap time of the gain after each switched laser pulse, said overlap being expressed:

$$\tau' = \frac{\tau}{1 + \Gamma \cdot \tau} \quad (6)$$

in which is the life of the excited level of the laser ion and the pumping rate such that:

$$\Gamma \cdot \tau = \frac{I_p}{I_{sat}} \quad (7)$$

in which $I_p$ is the pumping intensity and $I_{sat}$ the pumping saturation intensity.

Typically: $\Gamma \cdot \tau \approx 1$ to 10 for continuous laser diode powers (of approximately 1 to 10 mW) and life periods $\tau$ are approximately 1 millisecond ($Yb^{3+}$ ion) to a few 100 us ($Nd^{3+}$ ion).

However, the time separating two successive pulses must exceed the overlap time of the amplifier material (approximately 100 µs to 1 ms). Thus, $\Delta$ is the spectral gap between two successive sensors, the modulation period T being limited according to the relation:

$$\frac{\Delta}{\tau} > \frac{\Delta\lambda_u}{T} \quad (8)$$

in which $\Delta\lambda_u$ is the width of the spectral gain band defined hereinbefore.

Thus, the modulation frequency $$f = \frac{1}{T}$$

is subject to the following condition:

$$f < f_{max}^{(2)} = \frac{1}{\tau'} \cdot \frac{\Delta}{\Delta\lambda_u} = \frac{1}{n \cdot \tau'} = \frac{1 + \Gamma \cdot \tau}{n \cdot \tau} \quad (9)$$

in which n is the number of equidistant sensors in the gain curve.

Typically $\tau \approx 1$ ms and the critical modulation frequency $f_{max}^{(2)}$ due to the overlap time is limited to around a few hundred Hz for a 10 to 20 sensor array.

In practice, a safety margin is adopted so as to ensure a perfect overlap of the gain. The effective overlap time in fact exceeds by approximately a factor of 3 the theoretically defined factor of the laser.

The critical frequency due to the overlap time of the amplifier material $f_{max}^{(2)}$ is lower by approximately 2 orders of magnitude than the critical frequency $f_{max}^{(1)}$ due to the construction of the switched pulse. As the conversion frequency exceeds a few kHz, the modulation frequency of the overall demultiplexing system is consequently limited by $f_{max}^{(2)}$ (i.e. approximately 100 Hz for an array of about 20 sensors).

The solution making it possible to reduce the overlap time consists of seeking the ions having the shortest fluorescence life periods (whilst bearing in mind that the shorter said life period, the higher the laser threshold power). Equation (9) also suggests that the critical overlap frequency increases with the pumping power. As the pumping power has already been regulated in order to optimize the power of the pulses whilst avoiding an uncontrolled laser effect, the latter cannot be inconsiderably increased to reduce the overlap time.

Following each laser pulse, the gain of the doped fiber decreases considerably. The overlap time of the gain corresponds to the time necessary to ensure that the gain reassumes an adequate value for regenerating a new pulse. Typically, for rare earth ions, said overlap time is a few milliseconds between each sensor (i.e. a few dozen milliseconds for 10 to 20 sensors forming the measuring line).

Most high resolution, analog-digital converters (14 bits) are characterized by sampling frequencies well above 1 kHz, so that this point is not limitative.

The modulation frequency of the overall demultiplexing system is consequently limited by the critical frequency due to the overlap time (i.e. approximately 100 Hz for an array of twenty transducers). It is pointed out that the modulation frequency of the Fabry-Perot interferometer (Slew Rate) is well above 1 kHz.

The associated electronic instrumentation will now be considered.

The spectral width of the photoinscribed Bragg gratings is approximately 1 Å (0.1 nm) and the carrier wavelength is approximately 1000 nm. The sought resolution is approximately 0.01 nm, i.e. a resolution in deformation $$\frac{\Delta l}{l} = \frac{\Delta\lambda}{\lambda} \approx 10^{-5} = 10\mu\epsilon \ (1\mu\epsilon = 1 \ \mu m/m)$$

A resolution of 0.01 nm is sought on a carrier gain band of approximately 100 nm, so that the sought relative resolution is approximately $10^{-4}$.

Consideration can be given to a specific case, as illustrated in FIG. 3:

| | |
|---|---|
| Overlap time: | 1 ms |
| Number of sensors in the gain curve: | 20 |
| Gain curve: | 100 nm (1 sensor every 5 nm) |

-continued

| | |
|---|---|
| Scan time: | 60 ms (20 sensors × 3 ms) |
| Sought spectral resolution: | $10^{-4}$ |
| Corresponding time resolution: | 6 μs |

Knowing that the time width of the switched pulse is approximately the same as the life of the photon (cf. formula 3 above), cavities having lengths below approximately 1 kilometer give photon life periods of approximately 1 microsecond (cf. table II). As the laser pulse width is much smaller than the sought time resolution, the latter makes it possible to obtain a precise sampling of the modulation signal applied to the selective demultiplexing system (in this case the Fabry-Perot interferometer).

A switching method by pulses is therefore sufficiently precise for the sought application. Therefore the acquisition electronics can be simple, reliable, uses standard components and is not particularly complicated. The switched laser pulse has a high intensity and is therefore easy to detect by a photodiode, whose cut-off frequency is above a few MHz, which is easy to bring about with standard optoelectronic components.

An electronic detection arrangement can use laser pulses transmitted by the fast photodiode (MHz) as switching signals for an analog-digital converter having the function of measuring, at the time switched by the pulse, the effective value of the voltage applied to the Fabry-Perot interferometer representative of the tuning wavelength.

Bearing in mind the envisaged resolution ($10^{-4}$), the latter requires an analog-digital conversion on at least 16,000 points, i.e. at least 14 bits ($2^{14}=16,384$). Such converters are commercially mass produced. As the conversion speed is below a few ms, the latter takes place during the overlap time.

Figure 8:
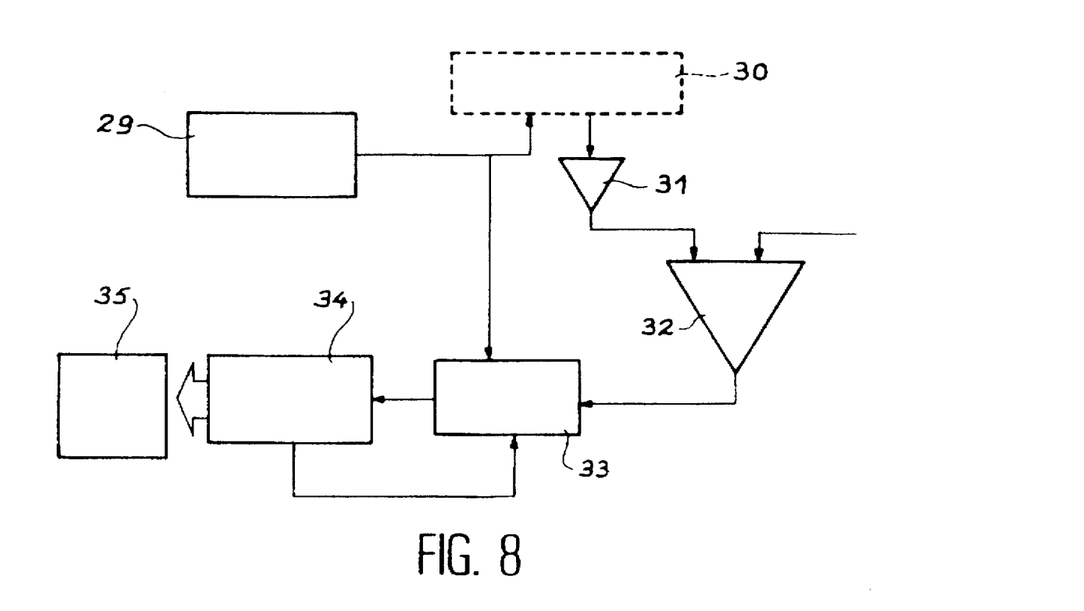
FIG. 8 illustrates an electronic system for the sequential acquisition of the Bragg tuning wavelengths according to the invention.

An electronic sequential acquisition system for Bragg tuning wavelengths is illustrated in FIG. 8. FIG. 8 shows the modulator 29 and optical device 30 illustrated in FIG. 2 with an input to the Fabry-Perot interferometer 20 and an output from the photodiode 27. To the output of said device 30 are successively connected an amplifier 31, a comparator 32, a sample and hold circuit 33, which receives the output from the comparator 32 on its switching input and the signal from the modulator 29 on its signal input. An analog-digital converter (coding on 14 bits or more) 34 connected to a computer 35 is located at the output of said sample and hold circuit 33, a resetting of the latter taking place at the end of conversion.

This electronic acquisition system functions as follows. As soon as the voltage applied to the Fabry-Perot interferometer 20 increases, the switched laser pulses appear. After thresholding by the comparator 32 (to prevent any switching by noise), the pulses emitted by the comparator switch the placing in the memory by the sample and hold circuit 33 of the voltage applied to the interferometer 20. This placing in memory is maintained for the time necessary for the conversion 34. The result of the conversion can be read at regular time intervals (below 1 ms) by the computer 35 provided with an adapted interface.

The method of sampling the sensor and measuring the parameters (strains, temperature and pressure) is known (cf. e.g. document [9]).

A direct application of the device according to the invention relates to the measurement of strains, pressures or temperatures distributed at several locations of a structure to be monitored (bridge, dam, composite material aircraft wing, ship, etc.). Several dozen measuring points can be ensured by a single measuring line, wavelength multiplexed through the gain band of the glass fiber lasers with a width of several dozen nm. The length of said measuring line is several dozen meters or more.

The device according to the invention solves the problem of the limitation of the SNR of passive strain sensors by applying a pulse mode detection principle. It also solves the problem of the capacity limitation of the sensor. This system also solves the problem of the spectral demodulation of the tuning wavelength by a relatively uncomplicated, simple and fast (100 Hz for several dozen sensors) electronic system, because it only requires a single selective element and standard electronic components.

TABLE I

| Laser ion | Pumping wave bands (nm) | Laser emission wave bands (nm) |
|---|---|---|
| $Yb^{3+}$ | 850 to 920 | 1000 to 1100 |
| $Nd^{3+}$ | 780 to 810 | 1040 to 1070 |
| | 850 to 885 and 930 to 940 | 1350 to 1360 |
| $Tm^{3+}$ | 650 to 675 and 790 to 800 | 1850 to 1950 and 1460 to 1500 and 2300 to 2400 |
| $Pm^{3+}$ | 1000 to 1030 | 1300 to 1310 |
| $Er^{3+}$ | 790 to 810 and 970 to 990 | 1530 to 1570 and 2710 to 2780 |

TABLE II

| | | | |
|---|---|---|---|
| Feedback loop - grating distance (m) | 1 | 10 | 100 |
| Typical photon life $\tau_R$ (ns) | 10 | 100 | 1000 |
| Critical construction frequency (kHz) | 100 | 10 | 1 |

REFERENCES

[1] W. W. Morey
   Distributed fiber grating sensors, OFS'90, pp 285–288
[2] W. W. Morey, UNITED TECHNOLOGY CORPORATION (USA)
   Distributed multiplexed optical fiber Bragg grating sensor arrangement—U.S. 91/4,996,419
   D. R. Lyons and S. M. Reich, GRUMMAN AEROSPACE CORPORATION (USA) Optical electronic multiplexing reflection sensor system—U.S. 93/5,191,458
[3] A. D. Kersey and W. W. Morey
   Multi-element Bragg grating based fiber-laser strain sensor Electr. Lett. vol. 29, No. 11, 1993, pp 964–966
[4] All-Fiber Fabry-Perot Scanning Interferometer FFP SI Micron Optics, Inc. 2801 Buford Hwy, Ste 140, Atlanta, Ga. 30329
[5] C. M. Miller
   Low-loss cascaded fiber Fabry-Perot with fineness greater than 3500 ECOC-IOOC '91, Paris, paper TuB3-2
[6] D. B. Mortimore
   Fiber loop reflectors J. of Light, Tech., vol. 6, No. 7, 1988, pp 1217–1224
[7] K. O. Hill, D. C. Johnson, F. Bilodeau and S. Faucher
   Narrow-bandwidth optical waveguide transmission filters Electr. Lett., vol. 23, No. 9, 1987, pp 465–466
[8] M. Digonnet and H. J. Shaw
   Wavelength multiplexing in single-mode fiber couplers Appl. Opt., vol. 22, No. 3, 1983, pp 484–491
[9] P. Ferdinand et al., OFS'94, 11–13 Oct. 94, Glasgow, pp 162–166
Publications:
G. Meltz, W. W. Morey and W. H. Glenn
   Formation of Bragg gratings in optical fibers by a transverse holographic method, Opt. Lett., vol. 14, No. 15, 1989, pp 823–825

Patents:

W. H. Glenn, G. Meltz and E. Snitzer, UNITED TECHNOLOGY CORPORATION (USA)

Method for impressing gratings within fiber optics—WO 86/01303

We claim:

1. Sensor device with a high signal-to-noise ratio, characterized in that it comprises at least one Bragg grating transducer photoinscribed on a dielectric guide and a feedback loop constituted by a Sagnac interferometer including a time modulated, wavelength selective element making it possible to implement a switched laser sensor.

2. Device according to claim 1, characterized in that it also has a Bragg grating transducer with different characteristic wavelengths contained in the gain spectral band of the amplifier material and that the demultiplexing of these transducers, as well as the measurement of their characteristic wavelengths are both obtained by selective laser switching producing sequentially a laser pulse succession.

3. Device according to claim 1, characterized in that the wavelength selective element is a tunable Fabry-Perot interferometer, whose free spectral range exceeds the useful gain curve width, which corresponds to the spectral gain band of the amplifier material sufficient to switch the laser effect.

4. Device according to claim 1, characterized in that it is integrated in "compatible fiber" form.

5. Device according to claim 1, characterized in that the Sagnac interferometer is of the balanced type, so that it behaves like a 100% reflective fiber reflector.

6. Device according to claim 1, characterized in that it comprises a coupler-multiplexer (23), connected at the input to a laser pumping diode (22) and to an output of a 50% adjustable coupler (21), whose two inputs are connected to a tunable Fabry-Perot interferometer (20), that the Bragg gratings (25) are photoinscribed on a fiber (26) welded to a doped fiber (24) connected to the coupler-multiplexer (23), which is terminated by the non-reflecting fiber (26), that a modulator (29) is connected on the one hand to the interferometer (20) and to an acquisition-sampling device (28) supplying a parallel output signal (SP) corresponding to the tuning wavelength values and that a photodiode (27) receiving the switched laser signal is also connected to said acquisition-sampling device.

7. Device according to claim 6, characterized in that the non-reflecting fiber (26) is terminated by a bevel or an antireflection deposit.

8. Device according to claim 6, characterized in that the coupler-multiplexer (23) is a fiber coupler-multiplexer designed to ensure the coupling of the pumping beam from the laser diode (22), whilst also ensuring the transmission of the laser beam to the feedback loop.

9. Device according to claim 6, characterized in that the doped fiber (24) is doped with rare earth ions.

10. Device according to claim 6, characterized in that it comprises an electronic system for the sequential acquisition of the Bragg tuning wavelengths.

11. Device according to claim 10, characterized in that said electronic acquisition system comprises an amplifier (31) connected to the photodiode (27), followed by a comparator (32), a sample and hold circuit (33), which receives the output of the comparator (32) on its switching input and the signal from the modulator (29) on its signal input, that an analog-digital converter of coding equal to or above 14 bits (34) connected to a computer (35) is located at the output of said sample and hold circuit (33) and a resetting of the sample and hold circuit (33) takes place at the end of conversion.

12. Use of the device according to claim 1 for monitoring strain in a structure.

13. Use of the device according to claim 1 for monitoring temperature in a structure.

* * * * *